United States Patent [19]

Berg et al.

[11] Patent Number: 4,983,342

[45] Date of Patent: Jan. 8, 1991

[54] METHOD OF MAKING WATER AND FIRE RESISTANT BUILDING MATERIAL

[75] Inventors: Johannes G. Berg, Hovik; Robert Smith-Johannsen, Borgheim, both of Norway

[73] Assignee: Norsk Proco A/S, Hovik, Norway

[21] Appl. No.: 332,923

[22] Filed: Apr. 4, 1989

Related U.S. Application Data

[62] Division of Ser. No. 2,064, Jan. 12, 1987, Pat. No. 4,820,345.

[30] Foreign Application Priority Data

Jan. 10, 1986 [NO] Norway ................................ 860066
Nov. 12, 1986 [NO] Norway ................................ 864501

[51] Int. Cl.$^5$ ............................ B28B 1/16; B28B 3/00
[52] U.S. Cl. .................................... 264/113; 264/256; 264/333
[58] Field of Search ............... 264/333, 256, 255, 113; 106/18.11, 18.12, 106, 105, 107, 108; 428/688, 689, 697, 699, 702, 704, 920, 921, 537.1, 532

[56] References Cited

U.S. PATENT DOCUMENTS

| Re. 32,329 | 1/1987 | Paszner | 264/115 X |
|---|---|---|---|
| 1,175,427 | 3/1916 | Freeman | 106/108 |
| 2,466,145 | 4/1949 | Austin et al. | 106/106 |
| 2,546,971 | 4/1951 | Byrns | 106/105 |
| 3,320,077 | 5/1967 | Prior | 106/105 |
| 3,853,571 | 12/1974 | Gelbman | 106/105 |
| 3,963,849 | 6/1976 | Thompson | 428/920 |
| 4,066,463 | 1/1978 | Chollet | 428/920 |
| 4,150,185 | 4/1979 | Prymelski | 264/122 X |
| 4,185,141 | 1/1980 | Krejci et al. | 427/300 X |
| 4,209,339 | 6/1980 | Smith-Johannsen | 106/106 |
| 4,235,836 | 11/1980 | Wassell et al. | 264/333 |
| 4,347,285 | 8/1982 | Batdorf | 427/388.4 X |
| 4,352,694 | 10/1982 | Smith-Johannsen | 106/106 |
| 4,608,087 | 8/1986 | Yoshino et al. | 106/18.12 |
| 4,683,019 | 7/1987 | Motoki | 106/75 X |
| 4,802,921 | 2/1989 | Motoki | 106/84 X |
| 4,818,595 | 4/1989 | Ellis | 106/105 X |

FOREIGN PATENT DOCUMENTS

| 376076 | 5/1923 | Fed. Rep. of Germany . | |
| 808570 | 7/1951 | Fed. Rep. of Germany . | |
| 141889 | 5/1976 | Norway . | |
| 1143725 | 3/1985 | U.S.S.R. | 106/18.11 |

Primary Examiner—Jan H. Silbaugh
Assistant Examiner—Karen D. Kutach
Attorney, Agent, or Firm—Pennie & Edmonds

[57] ABSTRACT

A method for making a water and fire resistant building material of a layered, shaped and hardened composition of one or more absorbant components, magnesia cement, chemically active fumed silica, alkali silicate, one or several inorganic fillers, one or several lignin sulphonates, eventually ethyl silicate, whereby the final product is built up of a two binder system, one of fumed silica, alkali silicate and optionally magnesium oxide and the other of magnesia cement and a lignin sulphonate salt. The method of producing the product includes forming a dual layered binder system having a very short press time.

24 Claims, No Drawings

METHOD OF MAKING WATER AND FIRE RESISTANT BUILDING MATERIAL

This is a division of application Ser. No. 07/002,064 filed Jan. 12, 1987, now U.S. Pat. No. 4,820,345.

This invention concerns water and fire resistant building materials based on a combination of magnesia cement, one or more absorbant materials, lignin sulphonate, chemically active fumed silica, alkali silicate, water as well as one or more additives. The invention also concerns the method of producing these materials.

BACKGROUND ART

Magnesia or SOREL has been known for about 100 years. It has the advantage over Portland cement in that it cures faster and sets harder. On the other hand magnesia cement is slightly water soluble, which results in a reduced water resistance for products made from magnesia cement. However, according to Norwegian patent No-PS 151035 its water resistance can be greatly improved by the addition of 0.5–2.0% by weight of ethyl silicate.

Building materials in sheet or strip form made by hot pressing and curing of a mixture consisting mainly of wood fibers, inorganic fillers, finely divided light calcined magnesia (MgO) and an aqueous magnesium chloride solution, and a method for producing them is described in Norwegian patent NO-PS 141889. Such a building product according to NO-PS 141889 is characterized by the cured mixture having:

(a) a weight ratio of MgO to wood fiber of 1:3–1:4,
(b) a weight ratio of $MgCl_2$ to wood fiber material of 1:9–1:12,
(c) an amount of chemically inactive silica of 2–15% based on the wood fiber content and
(d) possibly up to 5%, preferably 2–4% waterglass, based on the wood fiber content.

The procedure according to NO-PS 141889 is characterized by 30–40 parts by weight finely divided light calcined magnesia being mixed with 3–4 times its weight of a wood fiber filler which consists mainly of splinters with a length of at the most 20 mm, 2–8 parts by weight of inactive silica, at least one aqueous liquid containing 9–12 parts by weight $MgCl_2$ and 30–60 parts by weight of water, with possibly 1–5 parts waterglass, and where this mixture is formed and cured from 3–20 minutes at a pressure of 15–50 bar and a temperature of 120–220° C. Production of wood fiber boards according to NO-PS 141889 can be continuous by extrusion or piece by piece in a flat press.

Wood fiber boards made according to NO-PS 141889 are claimed to be dimensionally stable and "showed, even after, long submersion in water no noticeable swelling" (NO-PS 141889), page 7 lines 1–4.)

DETAILED DESCRIPTION OF THE INVENTION

The present invention concerns a water and fire resistant building material which is characterized by being a shaped and cured structure consisting of a layered combination of one or more absorbant components, magnesia cement, one or more lignin sulphonates, chemically active fumed silica, an alkali silicate, possibly one or more inorganic additives (fillers) and possibly ethyl silicate. The final product thereby consists of two binder systems, one consisting of water resistant magnesia cement, lignin sulphonate, preferably magnesium lignin sulphonate, and the other consisting of the reaction product of the chemically active fumed silica, alkali silicate and possibly magnesium oxide.

The invention further concerns the method of producing the above mentioned building material and is charactized by the layering of one or more absorbant materials which are thoroughly mixed with a dispersion of fumed silica in alkali silicate, possibly with ethyl silicate, and then with magnesium oxide and inorganic fillers, followed by a solution of magnesium salt containing lignin sulphonate in which also may be dispersed inorganic fillers, after which the finished composition is formed and cured under suitable pressure and temperature conditions until the free water in the mixture is bound as hydrate, and the material is shaped and hardened to form the desired building material.

In this building material, the absorbant material may be cellulose fiber, wood fiber, perlite, fly ash, mineral wool, glass wool, diatomaceous earth, or a mixture of two or more of these components. The magnesia cement may be magnesium oxychloride hydrate, magnesium oxysulfate hydrate or a mixture thereof. The lignin sulfonate salt is a calcium or magnesium salt or combination thereof. Preferably, the silica component is chemically active fumed silica, and the alkali silicate may be water glass, potassium silicate water glass, or mixtures thereof. Also, the inorganic filler additives are usually dolomite, feldspar or combinations thereof.

The new and essential feature of this invention is that the final product is built up of a combination of two binder systems. One of them, system A consists of water resistant magnesia cement with a lignin sulphonate salt, while the other, system B, consists of the reaction product of chemically active fumed silica, an alkali silicate and possibly magnesium oxide. By the layered structuring of the final product the two binder systems are separated from one another during the initial stages of curing, at which time they are incompatible with one another, and the curing reactions are assumed to take place independently of one another.

System A gives good early strength and short press time and contributes to high water and fire resistance.

System B develops and increases strength over a longer period of time as well as also having a beneficial effect on both water and fire resistance. In addition the use of the lignin sulphonate in combination with system A increases both strength and water resistance, especially when the absorbant base material consists of wood fibers.

The short press time is of vital importance in a commercial operation. According to this invention the cure time is in on the order of 2 minutes at a temperature of between 150–175° C. In contrast to this the SOREL described in U.S. Pat. No. 2,466,145 apparently requires much longer cure times. Usual practice with SOREL bonded wood fiber systems requires cure times up to 20 minutes.

An essential feature of the present invention is the layered addition of the reactive components. In contrast to this U.S. Pat. No. 1,175,427 states that it is immaterial how the different ingredients are mixed. The layered concept of the present invention is required because of the nature of the dual binder system.

A preferred embodiment of the procedure according to this invention requires the absorbant component to be covered as much as possible by a continuous layer of a dispersion of fumed silica in alkali silicate (water glass). The layer is rendered insoluble by the following addition of a layer or coating of magnesium oxide. After this the magnesium chloride or sulphate solution is added along with the lignin sulphonate, which may also contain dispersed inorganic filler materials. Under high pressure the absorbant components and binders are consolidated and at elevated temperature the magnesium cement hydrate is formed removing free water from the mix and storing it in the form of crystalline water.

When exposed to high temperature, as in a fire, the alkali silicate in the product expands and helps to shut off the supply of air (oxygen). The magnesia cement also under these conditions, gives off water over a wide temperature range, and in this way acts to limit the temperature and to smother the fire. The lignin sulphonate acts as a bridge between the magnesia cement structure and the cellulose in the wood fiber base material, and has the further advantage that it surprisingly improves the water resistance. Of the inorganic filler additives dolomite is especially attractive beCauSe under fire conditions it gives off carbon dioxide gas.

EXAMPLES

The following examples show that a building material made according to this invention has high bending strength and tensile strength little swelling and low water absorbsion under submersion in water, and good fire resistance. The components in the following examples were mixed in the indicated order and proportions and then layered prior to pressing.

Example 1 (Sample 989-28). Made in laboratory.

| | | |
|---|---|---|
| 1. | Coarse wood fiber | 18.9% |
| 2. | Fine wood fiber | 16.7% |
| 3. | { 29.8% fumed silica dispersed | 5.1% |
| | Water glass | 4.7% |
| 4. | Fumed silica ("Micropoz") | 5.6% |
| 5. | Premix containing: | 10.4% |
| | { 60.6% $MgCl_2.6H_2O$ | |
| | 14.7% Lignin sulphonate (Calcium) | |
| | 24.7% water | |
| 6. | Dolomite | 5.6% |
| 7. | Recycled surface grindings | 7.0% |
| 8. | Magnesium Oxide | 15.6% |
| 9. | Premix as in 5 | 10.4% |
| | | 100.0% |

Press time: 2.2 minutes
Press temperature: 160/170° C.

Example 2 (Sample 989-14). Made in laboratory

| | | |
|---|---|---|
| 1. | Coarse wood fiber | 20.8% |
| 2. | Fine wood fiber | 18.4% |
| 3. | Water glass | 5.2% |
| 3. | Fumed silica 29.8% dispersion | 4.7% |
| 4. | Dolomite | 6.1% |
| 4. | Fumed silica ("Micropoz") | 6.1% |
| 5. | Magnesium oxide | 17.2% |
| 6. | Premix containing: | 21.5% |
| | { 60.6% $MgCl_2.6H_2O$ | |
| | 14.7% Lignin sulphonate (calcium) | |
| | 24.7% water | |
| | | 100.0% |

Press time: 2.2 minutes
Press temperature: 160/170° C.

Example 3 (Sample 989). Full Scale Test.

| | | |
|---|---|---|
| 1. | Coarse wood fiber | 20.4% |

Example 3 (Sample 989). Full Scale Test. -continued

| | | | |
|---|---|---|---|
| 2. | Fine wood fiber | 18.2% | Premixed |
| 3. | Magnesium Oxide | 17.4% | |
| 4. | Dolomite | 6.0% | |
| 5. | Fumed silica ("Micropoz") | 6.0% | |
| 6. | Water | 7.2% | Premixed |
| 7. | Water glass | 3.7% | |
| 8. | Lignin sulphonate | 5.4% | Premixed |
| 9. | 33% $MgCl_2$ solution | 15.7% | |
| | | 100.0% | |

Press time 2.5 minutes.
Press temperature 163/170° C.

Example 4 (sample 498). Full Scale Test (comparative)

| | | | |
|---|---|---|---|
| 1. | Coarse wood fiber | 23.3% | |
| 2. | Fine wood fiber | 23.3% | Premixed |
| 3. | Water glass | 2.8% | |
| 4. | Water | 5.5% | |
| 5. | Magnesium Oxide | 20.6% | |
| 6. | Fumed silica ("Micropoz") | 5.5% | |
| 7. | Ethyl Silicate | 0.5% | |
| 8. | 33% $MgCl_2$ Solution | 18.5% | |
| | | 100.0% | |

Press time 3 minutes
Press temperature 120/136° C.

Example 5 (Sample 989-60). Made in laboratory

| | | |
|---|---|---|
| 1. | Coarse wood fiber | 18.7% |
| 2. | Premix containing: | 19.9% |
| | 25.9% water | |
| | 7.4% lignin sulphonate (calcium) | |
| | 30.3% $MgCl_2.6H_2O$ | |
| | 36.4% Fumed silica ("Micropoz") | |
| 3. | Fine wood fiber | 16.5% |
| 4. | Recycled surface grindings | 6.1% |
| 5. | Magnesium oxide | 15.4% |
| 6. | Premix as in 2 | 19.9% |
| 7. | Water glass | 3.5% |
| | | 100.0% |

Press time: 2.2 minutes.
Press temperature 170/170° C.

The completely cured building panels were then tested for the following properties:
Bending strength
Transverse tensile strength
Per cent swelling and water absorption in water after 2 and 24 hours submersion in water. The panels were further tested for fire resistance according to Norweigan procedure NS 3903 and NT Fire 004.

Reference is made to the curves, as shown in the graph bridging columns 5 and 6 of U.S. Pat. No. 4,820,345, for combustion gas temperature and smoke density which were carried out at the Laboratory for Investigation of Fire Technology (Brannteknisk Lab.) SINTEF in Trendheim.

Test Results

| | Example no. | | | | |
|---|---|---|---|---|---|
| | 1 | 2 | 3 | 4 | 5 |
| Bending strength, MPa Average of 5 samples | 9.0 | 11.5 | 12.5 | 8.1 | 10.4 |
| Transverse Tensile strength, MPa Average of 5 samples | 0.51 | 0.54 | 0.52 | 0.45 | 0.51 |

-continued

| Test Results | Example no. | | | | |
|---|---|---|---|---|---|
| | 1 | 2 | 3 | 4 | 5 |
| Swelling in water % after 2 hours average 3 samples | 2.0 | 5.2 | 3.9 | 4.7 | 4.1 |
| Swelling in water % after 24 hours average 3 samples | 7.1 | 11.7 | 12.6 | 12.7 | 10.8 |
| Water absorption % after 2 hours average 3 samples | 9.0 | 16.0 | 16.0 | 14.1 | 9.7 |
| Water absorption % after 24 hours average 3 samples | 23.7 | 32.0 | 33.0 | 34.2 | 26.4 |
| Fire test: NS3903 and NT Fire 004 Limit: K1/IN1 Under Limit curve 1 (U.S. Pat. No. 4,820,345) | Yes | Yes | Yes | Yes | Yes |

We claim:

1. A process for making a fire and water resistant building material which comprises:
   arranging a plurality of components in layers to form a layered structure of the components, one of the layers comprising a first binder system of a magnesia cement and a lignin sulfonate salt, and another of the layers comprising a second binder system of chemically active fumed silica and an alkali silicate, the layers of binder systems being arranged to be separated from each other; and
   curing the layered structure at a suitable pressure and temperature and for a sufficient time to enable the first and second binder systems to cure independently, while also converting free water in the layers to a hydrate which is retained in the cured structure, thus forming the building material.

2. The process of claim 1 wherein the plurality of components in a layer are separately mixed before being arranged in the layered structure.

3. The process of claim 1 which further comprises conforming the layered structure to a desired shape before the curing step is completed.

4. The process of claim 1 which further comprises utilizing dolomite, feldspar or mixtures thereof as one of the layers in the layered structure.

5. The process of claim 1 wherein the structure is cured at a temperature of between about 150 and 175° C.

6. The process of claim 1 wherein an absorbent material is present in an amount of between about 10 and 70 percent by weight, the magnesia cement is present in an amount of between about 10 and 70 percent by weight, the lignin sulfonate slat is present in an amount of between about 0.1 and 15 weight percent, the fumed silica is present in an amount of between about 1 and 25 weight percent, the alkali silicate is present in an amount of between about 1 and 25 weight percent, and an inorganic filler additive is present in an amount of up to about 30 weight percent.

7. The process of claim 1 wherein the structure is cured at a sufficient temperature and pressure to provide a cure time on the order of about 2 to 2.2 minutes.

8. The process of claim 7 wherein the curing temperature ranges from about 150 to 175° C. and the cure time is about 2.2 minutes.

9. A process for making a fire and water resistant building material which comprises:
   layering one or a plurality of components selected from the group consisting of absorbent material, magnesia cement, a lignin sulfonate salt, chemical active fumed silica, an alkali silicate, ethyl silicate, and inorganic filler additives in a plurality of layers to form a layered structure having first and second binder systems in separated layers, wherein the first binder system includes the magnesia cement and lignin sulfonate salt, and the second binder system includes the chemically active fumed silica, alkali silicate and ethyl silicate;
   shaping the layered structure to a desired shape; and
   curing the shaped structure at a suitable pressure and temperature and for a sufficient time to form the building material.

10. The process of claim 9 wherein the binder system cure independently of each other.

11. The process of claim 9 wherein the structure is cured at a temperature of between about 150 and 175° C.

12. The process of claim 9 wherein the absorbent material is present in an amount of between about 10 and 70 percent by weight, the magnesia cement is present in an amount of between about 10 and 70 percent by weight, the lignin sulfonate salt is present in an amount of between about 0.1 and 15 weight percent, the fumed silica is present in an amount of between about 1 and 25 weight percent, the alkali silicate is present in an amount of between about 1 and 25 weight percent the ethyl silicate is present in an amount of up to about 5 weight percent, and the inorganic filler additive is present in an amount of up to about 30 weight percent.

13. The process of claim 9 wherein the structure is cured at a sufficient temperature and pressure to provide a cure time on the order of about 2 to 2.2 minutes.

14. The process of claim 13 wherein the curing temperature ranges from about 150 to 175° C. and the cure time is about 2.2 minutes.

15. A process for making a fire and water resistant building material which comprises:
   arranging a plurality of components selected from the group consisting of an absorbent material, magnesia cement, a lignin sulfonate salt, chemically active silica, and an alkali silicate in layers to form a layered structure, each layer including at least one of the components;
   forming first and second separated binder systems by the arrangement of the layers, wherein the first binder system includes the magnesia cement and lignin sulfonate salt, and the second binder system includes the chemically active fumed silica and an alkali silicate; and
   pressing the layered structure for a sufficient time at a suitable temperature to independently cure the first and second binder systems while also converting free water in the layers to a hydrate which is retained in the cured structure, thus forming the building material.

16. The process of claim 15 which further comprises conforming the layered structure to a desired shape before the binder systems are cured.

17. The process of claim 15 which further comprises including a layer of dolomite, feldspar or mixtures thereof in the layered structure.

18. The process of claim 15 wherein the binder systems are cured at a temperature in a range of about 150 to 175° C. for about 2 to 2.2 minutes.

19. The process of claim 15 which further comprises forming a layer of absorbent material, and covering the absorbent material with a layer of a dispersion of fumed silica in alkali silicate, thus forming the second binder system.

20. The process of claim 19 which further comprises rendering insoluble the layer of fumed silica in alkali silicate by adding a layer of magnesia cement thereupon.

21. The process of claim 20 wherein the first binder system is formed by adding a solution of a magnesium salt with the lignin sulfonate salt upon the magnesia cement layer.

22. The process of claim 21 which further comprises including a layer of inorganic filler material in the layered structure.

23. The process of claim 22 which further comprises including a layer of ethyl silicate adjacent the layer of fumed silica in alkali silicate.

24. The process of claim 23 wherein the absorbent material is present in an amount of between about 10 and 70 percent by weight, the magnesia cement is present in an amount of between about 10 and 70 percent by weight, the lignin sulfonate salt is present in an amount of between about 0.1 and 15 weight percent, the fumed silica is present in an amount of between about 1 and 25 weight percent, the magnesium salt is present in an amount of between about 5.181 and 13 weight percent, the alkali silicate is present in an amount of between about 1 to 25 weight percent, the ethyl silicate is present in an amount of up to about 5 weight percent, and the inorganic filler material is present in an amount of up to about 30 weight percent.

* * * * *